(12) United States Patent
Begeja et al.

(10) Patent No.: US 6,243,445 B1
(45) Date of Patent: *Jun. 5, 2001

(54) METHOD AND APPARATUS FOR TELEPHONE DATA NETWORK ACCESS

(75) Inventors: Lee Begeja, Gillette; Andrew J. Berkley, Summit, both of NJ (US)

(73) Assignee: AT&T Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,049

(22) Filed: Nov. 3, 1998

(51) Int. Cl.[7] .................................................. H04M 11/00

(52) U.S. Cl. ..................................... 379/93.01; 379/93.25; 370/352

(58) Field of Search ............................... 379/93.01, 93.05, 379/93.25, 90.01, 100.11, 88.17, 88.18, 88.01, 88.04, 88.13, 88.12, 88.15, 93.26, 93.15; 370/352, 353, 354, 355, 356, 400, 420; 704/270; 709/200, 217, 218, 219

(56) References Cited

U.S. PATENT DOCUMENTS

| 5,884,262 | * | 3/1999 | Wisw et al. ........................... 704/270 |
| 5,915,001 | * | 6/1999 | Uppaluru ............................ 379/88.17 |
| 5,953,392 | * | 9/1999 | Rhie et al. ........................... 379/88.13 |
| 5,995,597 | * | 11/1999 | Woltz et al. ........................ 379/88.15 |
| 6,049,596 | * | 4/2000 | Dumaine et al. .................. 379/93.05 |

* cited by examiner

Primary Examiner—Curtis Kuntz
Assistant Examiner—Melur Ramakrishnaiah
(74) Attorney, Agent, or Firm—Oliff & Berridge, PLC

(57) ABSTRACT

This invention provides a telephone-data network access system that permits voice communication device users to access a data network such as the Internet. A telephone-data network access device receives commands from callers and executes the commands on the data network such as send e-mail, search the data network, log on to pages supported by other parties on the data network, etc. A caller profile saves preferences of a caller for interacting with the data network. The telephone-data network access device may supply primitive commands for the caller to use individually or to construct complex command macros so that by a single command, more complex functions may be performed using the data network. By the above described techniques, callers who do not have access to devices such as a personal computer may access the data network and take advantage of the rich resources available through the data network.

20 Claims, 11 Drawing Sheets

| SOURCE 303 | FUNCTIONS 305 |
|---|---|
| E-MAIL (302) | CONVERT TO VOICE AND PLACE IN VOICE MAILBOX |
| PAGE (304) | RECORD NUMBER OF HITS PER DAY |
|  | UPDATE GUEST DATABASE |
|  | OUTPUT WEEKLY BY FACSIMILE TO 1-286-312-5782 |

| NAME 307 | ADDRESS 309 |
|---|---|
| JOE (306) | JOE@EROLS.COM |
| KAREN (308) | KAREN@ATT.COM |
| TENNIS (310) | LEE@AOL.COM |
|  | ANDREW@PICKINGS.ORG |
|  | CHERRY@CORNWELL.EDU |

FIG. 5

| VOICE COMMAND — 312 | FUNCTION — 314 |
|---|---|
| SKIP | IGNORE CURRENT ITEM; GO ON TO NEXT ITEM |
| FASTER | INCREASE SPEED OF OUTPUT SPEECH |
| SLOWER | DECREASE SPEED OF OUTPUT SPEECH |
| REPEAT | REPEAT LAST ITEM |
| FIND <WORD> | SEARCH FOR <WORD> |
| GOTO <NAME> | ACCESS A PAGE IMMEDIATELY, FOR EXAMPLE |
| SEARCH <DATA> | NETWORK SEARCH FOR <DATA> |
| BOOKMARK <NAME> | SAVE CURRENT URL AS <NAME> |
| PRINT | PRINT CURRENT ITEM AND PUT IN MAIL |
| FAX | SEND IMAGE OF CURRENT ITEM BY FACSIMILE |
| DICTATE | CONVERT VOICE TO TEXT |
| ... | ... |

| KEY /316 | FUNCTION /318 |
|---|---|
| "2" | UP |
| "5" | DOWN |
| "4" | LEFT |
| "6" | RIGHT |
| "0" | REPEAT |
| "*3"<WORD> | FIND <WORD> WHERE WORD IS <1,2,3> <1-9> |
| "*7"<DATA> | SEARCH <DATA> WHERE WORD IS <1,2,3> <1-9> AND "0" IS SPACE |
| ... | ... |

*FIG. 6*

DATA RETURN PREFERENCES

TELEPHONE CALL

FACSIMILE

PAGER MESSAGE

VOICE MAILBOX

METHOD AND APPARATUS FOR TELEPHONE DATA NETWORK ACCESS

BACKGROUND OF THE INVENTION

1. Field of Invention

This invention relates to accessing data networks by using voice communication devices.

2. Description of Related Art

Data networks such as the Internet have gained widespread acceptance as a desirable communication medium as well as a source of information. Conventionally, data networks are accessed via devices such as personal computers. Such devices provide visual outputs through a video display and data entry through a keyboard, for example. Additionally, personal computers provide a local storage medium for retrieving data from the data network and storing user preferences, for example. However, potential users that do not have access to a personal computer, for example, are prevented from taking advantage of the benefits provided through a data network. Thus, new technology is needed to make available the data network in such circumstances.

SUMMARY OF THE INVENTION

This invention provides a telephone-data network access system that permits voice communication device users to access a data network such as the Internet. Callers using a voice communication device such as a telephone station may call a telephone-data network access device through the telephone network and issue voice commands or keypad commands to instruct the telephone-data network access device to access a data network. After logging onto the data network, the caller may issue voice commands to the telephone-data network access device to send e-mail, search the data network, or log on to pages supported by other parties on the data network as would be done by a person using a personal computer.

The telephone-data network access device provides voice commands to the caller to easily navigate the network or pages supported by the network. For example, voice commands may be find, search, skip, faster, slower or repeat. The telephone-data network access device converts the voice commands of the caller into text by voice to text conversion and executes the commands. The responses from the data network is converted from text to voice by speech synthesis, for example, and the voice signals output to the caller through the telephone network and the voice communication device.

The telephone-data network access device provides a profile for a caller where the caller may save preferences for interacting with the data network. For example, the caller may establish outbound mail directories where a voice label may be associated with an e-mail address so that the caller may simply say "send e-mail to Lee" and instruct the telephone-data network access device to receive dictation from the caller and send it as a message to an e-mail address corresponding to the voice label "Lee". In addition, the telephone-data network access device may supply primitive voice commands for the caller to use individually or construct more complex voice command macros so that by a single command, more complex functions may be performed using the data network.

By the above described techniques, callers who do not have access to devices such as a personal computer may access the data network and take advantage of the rich resources available through the data network. For example, callers may be traveling and not have access to a personal computer but wish to retrieve information from the network. In such circumstances, the telephone-data network access device provides the caller the ability to interface with the data network without using a device such as a personal computer.

BRIEF DESCRIPTION OF THE DRAWINGS

The invention is described in connection with the following figures wherein like numerals represent like elements, and wherein:

FIGS. 3 and 4 show inbound and outbound parameters of the user profile;

FIG. 5 shows voice command parameters of the user profile;

FIG. 6 shows the keypad command parameters;

FIG. 7. shows data return parameters;

DETAILED DESCRIPTION OF PREFERRED EMBODIMENTS

Figure 1:
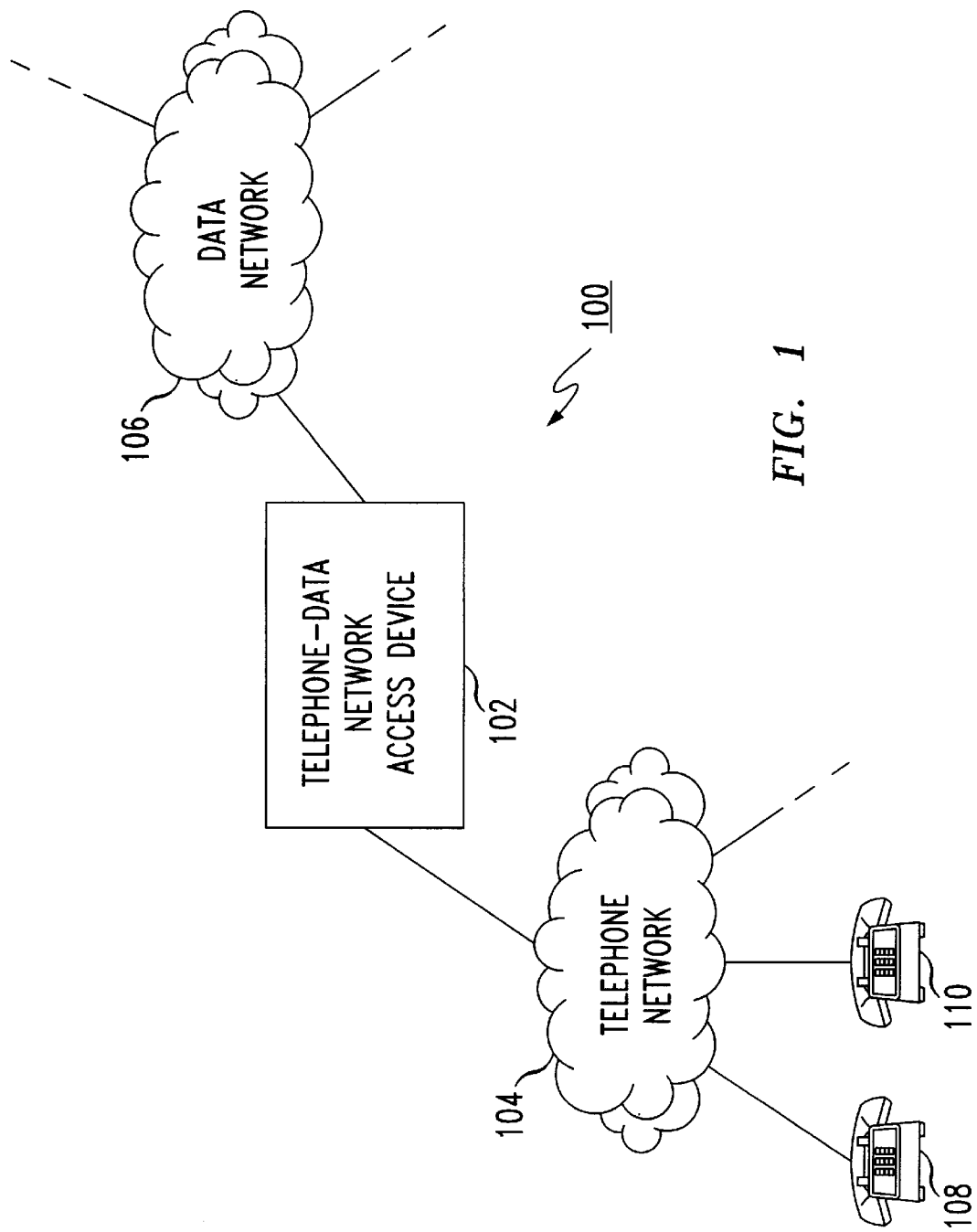
FIG. 1 is a diagram of a telephone-data network access system.

FIG. 1 shows a telephone-data network access system 100 that includes a telephone network 104, voice communication devices 108 and 110 coupled to the telephone network 104, and a telephone-data network access device 102 coupled to the telephone network 104 and a data network 106. The voice communication devices 108 and 110 may be wired or wireless and may include cellphones, cable telephony devices, and/or fixed wireless devices, for example. The data network 106 may be the Internet, for example.

When a caller desires to access the data network 103 using a voice communication device such as voice communication device 108, the caller calls the telephone-data network access device 102 by dialing an 800 number, for example. If the caller is a subscriber, the telephone-data network access device 102 retrieves a profile for the caller and performs any initial setup that may be required such as logging on the data network 106 using an identification that is associated with the caller.

If the caller is not a subscriber, the telephone-data network access device 102 may send a message to the caller offering data network access services and requesting an account number such as a calling card number or a telephone number account to which the services may be billed. After receiving the required numbers, the telephone-data network access device 102 interacts with the caller to determine what services the caller may wish to use. For example, the non-subscriber caller may request that the telephone-data network access device 102 to set up a user ID which may be used to receive e-mail, a page on the data network 106, or to log on to the data network 106.

Assuming that the caller (subscriber or non-subscriber) desires to log on to the data network 106, the telephone-data network access device 102 acts as an interface for the caller to the data network 106. Various commands either via voice or via keypad entry are provided for the caller so that the caller may perform all the functions available on the data network 106. For example, the caller may wish to send e-mail to other parties. In this case, the caller may issue a voice command "send e-mail to begeja@att.com". The telephone-data network access device 102 may respond by requesting a message that the caller desires to send. When the message is received, the telephone-data network access device 102 sends the e-mail to the e-mail address as instructed by the caller.

The caller may desire to review e-mail and issue a voice command "get-mail". In this case, the telephone-data network access device 102 checks the mailbox and outputs a message to the caller either indicating that no mail was found or providing a list of the mail that was found. The telephone-data network access device 102 may provide the list by using speech synthesis to generate speech indicating the titles of each of the e-mail messages and the e-mail addresses from which the e-mail was sent. Other convenient features might be providing a number, a name such as "susan", or content such as "budget" for each of the e-mail messages so that the caller may choose one of the e-mail messages to open. Thus, after receiving the list of e-mail messages, the caller may say "open 3", "susan", or "budget" indicating the desire to open the third e-mail message or the message associated with "susan" or "budget", for example. The caller may also use the keypad of the voice communication device and simply press "3" to direct the telephone-data network access device 102 to open the third e-mail message.

When the telephone-data network access device 102 receives the "open 3" command, the third e-mail message is opened and the telephone-data network access device 102 reads the e-mail to the caller via speech synthesis. The caller may use additional voice commands such as "repeat", "skip", "back", etc. The telephone-data network access device 102 performs the requested command so that the caller may navigate through the e-mail message easily using the voice communication device 108, for example. Again, the caller may also use a voice communication device keypad to issue any of the commands to navigate through the e-mail message.

Similar to the above, the caller may perform other functions available on the data network 106. For example, the caller may choose to query the data network 106 using one of the available search engines to obtain a query result and then navigate through the query result to identify a particular data network site to access and to navigate. The caller may send messages to any of the accessed pages, participate in a chat room where voice to text and text to voice conversions link the caller with other chat room participants, or send queries to user nets. User nets are standing forums in which questions may be asked and answers may be received from other parties participating in the forum. Responses may be received from any of the above actions and the telephone-data network access device 102 may report the responses to the caller either immediately or at a later time after the responses are collected.

If the responses are to be reported to the caller at a later time, the telephone-data network access device 102 stores the results in a database and contacts the caller based on a caller profile. For example, the caller profile may indicate that the reports should be sent to the caller by facsimile at a specific facsimile number. The caller may also specify that when the reports arrive, the telephone-data network access device 102 should inform the caller via a page at a specified pager number or initiate a telephone call to the caller so that the caller may call the telephone-data network access device 102 to review the results of the prior data network actions.

Figure 2:
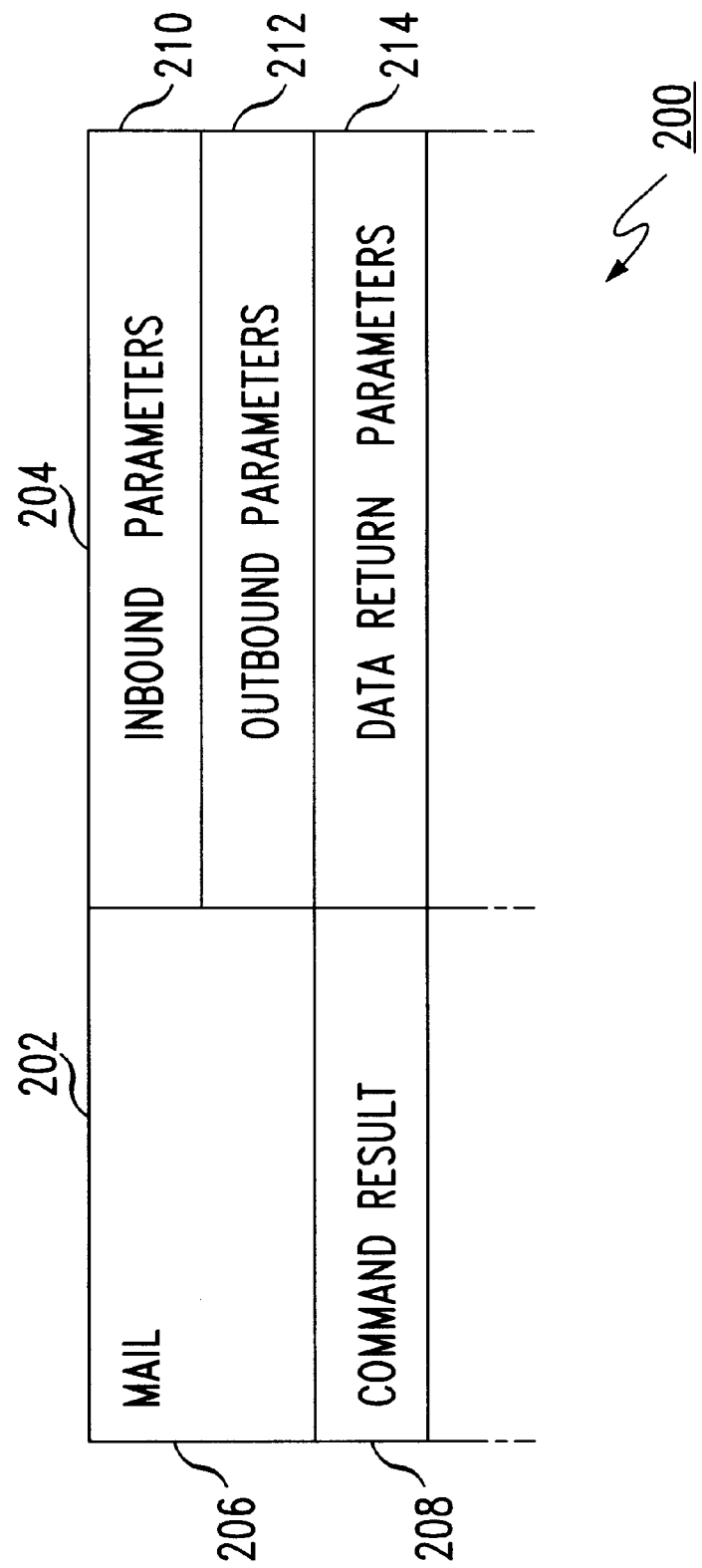
FIG. 2 shows an overview diagram of a user profile.

FIG. 2 shows an overview of an exemplary profile 200. The profile 200 includes an entry field 202 and a parameters field 204. For example, FIG. 2 shows a mail entry 206 and a command result entry 208. The mail entry 206 includes parameters 210 related to inbound mail and parameters 212 related to outbound mail and the command result entry 208 includes data return parameters 214. FIG. 3 shows an example of inbound mail parameters 210 which include an inbound mail source 303 and a corresponding functions field 305. For example, for e-mail 302, the profile 200 specifies to convert the e-mail to voice and place the e-mail in a voice mailbox. Other alternative functions may be performed such as only convert an e-mail Subject or Title to voice and place the converted text in the voice mailbox but leave the body of the e-mail unconverted until requested by the caller. In this way, the caller may save costs required to convert the message to voice.

The caller may have requested the telephone-data network access device 102 to set up a network page where other users of the data network 106 may visit the caller's page. Thus, a page entry 304 may specify functions such as to record the number of hits per day that is received by the page, to update a guest sign-in database of all those who hit the page and signed in as a guest, and to output the above recorded data weekly by facsimile to a specific facsimile telephone number as shown in FIG. 3.

FIG. 4 shows an example of outbound mail parameters having a name field 307 and an address field 309. The name field 307 may contain voice labels provided by the calling party and the address field 309 may contain the e-mail address of the party, for example. Thus, entry 306 contains the voice label "Joe" and the e-mail address for Joe which is joe@erols.com. Similarly, the entry 308 may contain a voice label for "Karen" having the e-mail address karen@att.com. Entry 310 has a voice label for "tennis" which is a list of e-mail addresses such as lee@aol.com, andrew@pickings.org and cherry@cornell.edu, for example. Thus, the caller may dictate a message and direct the telephone-data network access device 102 to send a dictated message to a voice label which may be a single party or a list of parties.

FIG. 5 shows examples of possible voice commands in a voice command database. The voice command database 314 includes a voice command field 312 and a function field 314. The voice command field 312 may correspond to voice commands described below. The "skip" voice command may instruct the telephone-data network access device 102 to ignore the current item and go on to the next item. For example, if the caller is reviewing e-mail messages, and, after hearing the first line of the message, decides to skip the e-mail message and go on to the next e-mail message, the caller simply says "skip" and the telephone-data network access device 102 skips the current e-mail message, opens the next e-mail message and begins to output the speech for the next e-mail message.

When reviewing a list of items from a network search, the skip voice command may instruct the telephone-data network access device 102 to skip a current item to a following item in the list. Thus, the skip voice command may be interpreted by the telephone-data network access device 102 contextually. The calling party may personalize the meaning of voice commands for each context in which they are used.

For example, the calling party may select a meaning of a voice command from a list of predefined meanings and a list of contexts provided by the telephone-data network access device 102. The calling party may also change the voice label for a voice command. For example, the calling party may change "skip" to "next" when used in the network search context.

The "faster" and "slower" voice commands permit the caller to adjust the speed of speech output from the telephone-data network access device 102 according to the desire of the caller. The "repeat" voice command instructs the telephone-data network access device 102 to repeat the last item generated by the speech synthesis. For example, in the e-mail context, the repeat voice command may cause the telephone-data network access device 102 to repeat the last word that was output to the caller. The caller may modify the repeat command to output the last phrase or the last sentence or the last five seconds of speech, for example.

The "find" voice command may direct the telephone-data network access device 102 to search for a word such as "find karen". For example, the caller may instruct the telephone-data network access device 102 to search for a particular word in a long e-mail message such as "tennis". When navigating, the caller may use the "find" voice command to search for a particular section of the page by providing a keyword. When the location of the search word is found, the telephone-data network access device 102 may output the content of a line where the search word is found so that the caller may determine the next action to take.

All of the above voice commands relate to navigating text. The telephone-data network access device 102 may also provide voice commands to "surf" the data network 106. For example, the "go to" voice command directs the telephone-data network access device 102 to immediately access a page, for example. Thus, "go to www.candy.com" causes the telephone-data network access device 102 to access the specified page on the data network 106. The search voice command may instruct the telephone-data network access device 102 to search the complete data network 106 using a search engine that may be explicitly specified or specified by the user in the user profile. For example, the user may have specified the preferred search engine to be "YAHOO". In this case, the telephone-data network access device 102 enters the search data as provided by the caller for the YAHOO engine and reports the results of the search to the caller.

The remaining voice commands shown in FIG. 5 are additional examples of possible commands that may be provided. The "bookmark" command updates a directory of data network addresses with a current address visited by the caller. Thus, when the caller issues the bookmark command, such as "bookmark tennis", the address of a current site (or page) is placed in a directory having the voice label "tennis" indicated. The print voice command instructs the telephone-data network access device 102 to print items being considered by the caller. For example, if the caller is reviewing an e-mail message, the "print" voice command makes a hard copy of the e-mail message. The caller may specify either explicitly or in the profile whether to print to file, make a hard copy and mail it to the caller, or send a copy by facsimile to the caller at a designated facsimile number. The "fax" voice command is similar to the print voice command except the facsimile voice command directly instructs the telephone-data network access device 102 to send a specified item by facsimile. The "dictate" voice command instructs the telephone-data network access device 102 to convert the speech of the caller into text and to save the text until a further voice command such as a "mail" voice command sends the text as an e-mail to parties specified in the outbound mail parameters.

The voice commands shown in FIG. 5 and discussed above are merely examples and not exhaustive. Many other voice commands may also be provided to enhance the convenience of the caller to manipulate items accessible through the data network 106 such as for sorting e-mail messages or search results.

The caller may construct new voice commands by instructing the telephone-data network access device 102 to learn voice labels spoken by the caller and associate it with combinations of existing voice commands. For example, the caller may combine the "go to" voice command with the "bookmark" voice command to create a "go mark" voice command. Thus, voice command macros may be generated by making combinations of existing voice commands. The telephone-data network access device 102 may provide a large inventory of primitive voice commands which may be selected by the caller to assign to a caller-designated voice label or to be combined in a voice macro for a more complex voice command.

The caller may also specify keypad commands using a keypad that may be available on voice communication devices. For example, FIG. 6 shows that the keys of the keypad corresponding to 2, 5, 4, 6 and 0 may be used as commands for "up", "down", "left", "right", and "repeat", respectively. For example, if the caller is reviewing an e-mail message, and presses 2 on the keypad, then the telephone-data network access device 102 may stop reading the current line and move up one line and begin reading the new line. Pressing 4 and 6 may cause the telephone-data network access device 102 to read a word to the left of the current word or to the right of the current word, and pressing 0 may cause the telephone-data network access device 102 to repeat a word, a line or a sentence as may be further specified by the caller, for example.

More complex keypad commands may also be provided or constructed by the caller such as "*3" or "*7", for example. The *3 keypad command may indicate that the following keypad entries define text that the telephone-data network access device 102 should use as an operand for a prior voice command. For example, the "go to" voice command following by "*3" www.tennis.com" commands the telephone data network access device 102 to go to www.tennis.com. A single letter may be specified by pressing keys for 1, 2, or 3 followed by one of the other keys of a conventional keypad to select one of the letters. For example, "a" would be 1,2 and "k" would be 2,5.  may represent a '.', for example. The same method may be used to enter data for a search command. As with voice commands, the caller may define other keypad commands by combining selected primitive commands offered by the telephone-data network access device 102**.

Some commands may not immediately return results. For example, if the caller directed the telephone-data network access device 102 to perform a search during a highly congested period of the data network 106, the results of the search may take many seconds or minutes to complete. Thus, the caller may choose for the telephone-data network access device 102 to record the results of the search and either send the results to the caller via facsimile, for example, or alert the caller via a phone call, or a pager message when the results are ready. Thus, as indicated in FIG. 2, the caller may specify data return parameters 214 in the command result entry 208 of the profile to indicate which of the communication services subscribed by the caller may be used and a priority order which the services are to be used to contact the caller. FIG. 7 shows an example of the data return parameters 214 for the caller where the caller wishes to be contacted by a telephone call first, then by facsimile, then by pager message, and last of all by a message in a voice mailbox.

Figure 8:
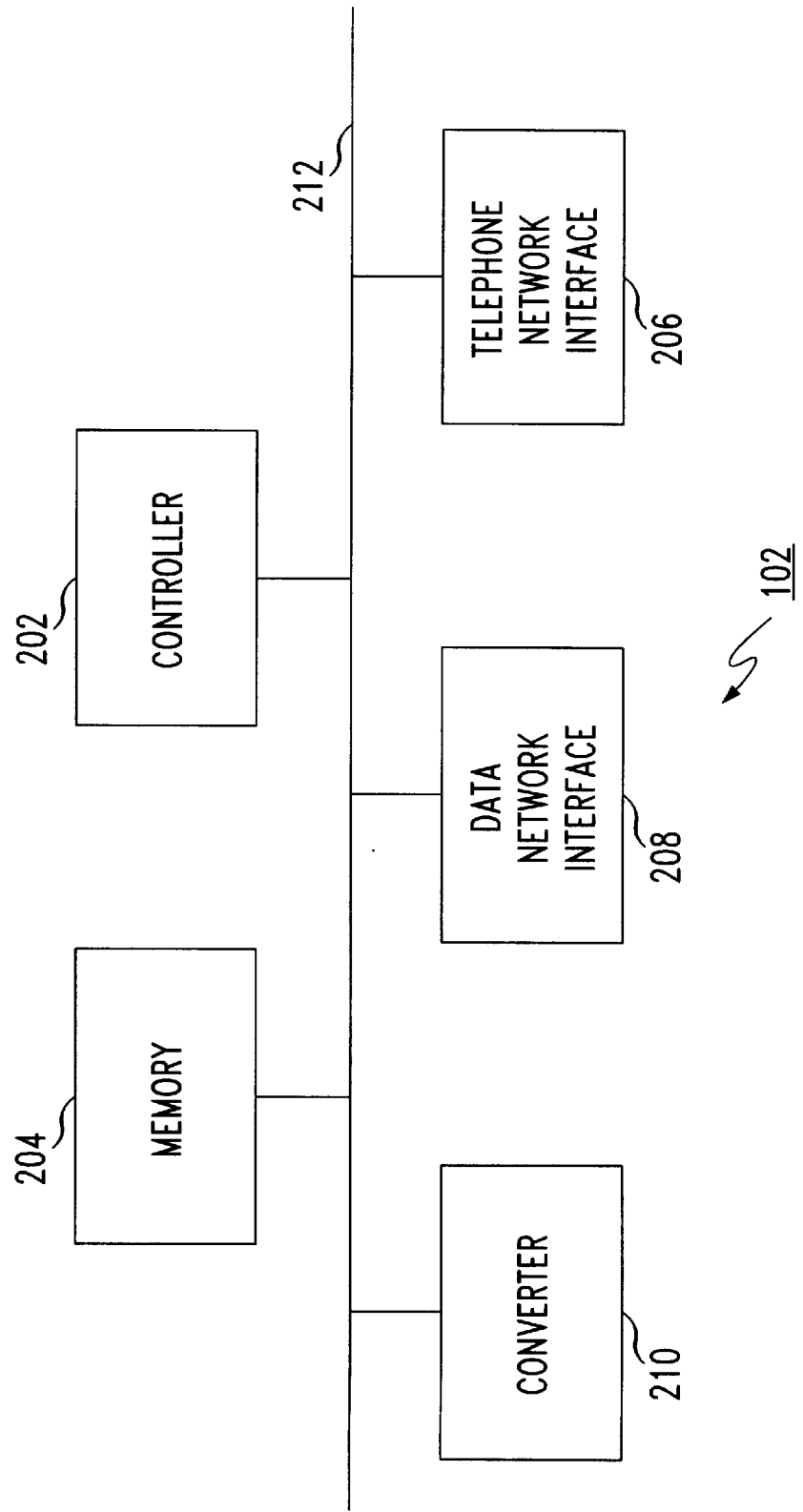
FIG. 8 shows a block diagram of a telephone-data network access device.

FIG. 8 shows an exemplary block diagram of the telephone-data network access device 102. The telephone-data network access device 102 includes a controller 202, a memory 204, a telephone network interface 206, a data network interface 208 and a converter 210 that converts text to voice and voice to text. The above components are coupled together via signal bus 212. The architecture and components shown in FIG. 8 may be implemented using generally available components, applications specific integrated circuits (ASICs), PLAs or other hardware components. The architecture shown in FIG. 8 is only representative and other architectures such as connecting the memory 204 directly to the controller 202 are also possible.

When a caller calls the telephone-data network access device 102, the call is received through the telephone network interface 206 and forwarded to the controller 202. The controller 202 interacts with the caller to determine whether the caller is a subscriber or not. If a subscriber, the controller 202 requests access identification from the subscriber. If not a subscriber, the controller 202 performs initial processing for non-subscribers such as requesting an account number to which the call should be billed and other messages such as basic default voice commands, etc. These messages may be bypassed for experienced non-subscribers by pressing "*", for example. After validating the requested access identification or billing information, the controller 202 loads a profile for the caller from the memory 204 and then outputs an initial message to invite the caller to begin by issuing a command.

When the command is received, the controller 202 executes the command and then determines whether the results of the command may be received immediately or a delay may be involved. If a delay may be involved, the controller 202 sets a timer for a short time. If the timer expires, the controller 202 queries the user whether the user desires to wait any longer for the results of the command or to obtain the results at a later time. If the caller decides to receive the results at a later time, the controller 202 ends the call, collects the results as they arrive and reports the results to the caller based on the data return parameters 214 in the caller profile stored in the memory 204, for example. If the caller decides to wait for the results of the command, the controller 202 reports the results to the caller when received.

As indicated earlier, the caller may use voice commands to direct the controller 202. After receiving the voice command, the controller 202 sends the voice command to the converter 210 to convert the voice command into text and then executes the commands via the data network interface 208, for example. When the results of the command are received through the data network interface 208, the controller 202 may send the results to the converter 210 to convert the results into voice and send the voice signals to the caller through the telephone network interface 206. Thus, the telephone-data network access device 102 permits a caller to use a voice communication device 108, 110 to access information on the data network and perform all the functions provided by the data network 106.

Figure 9:
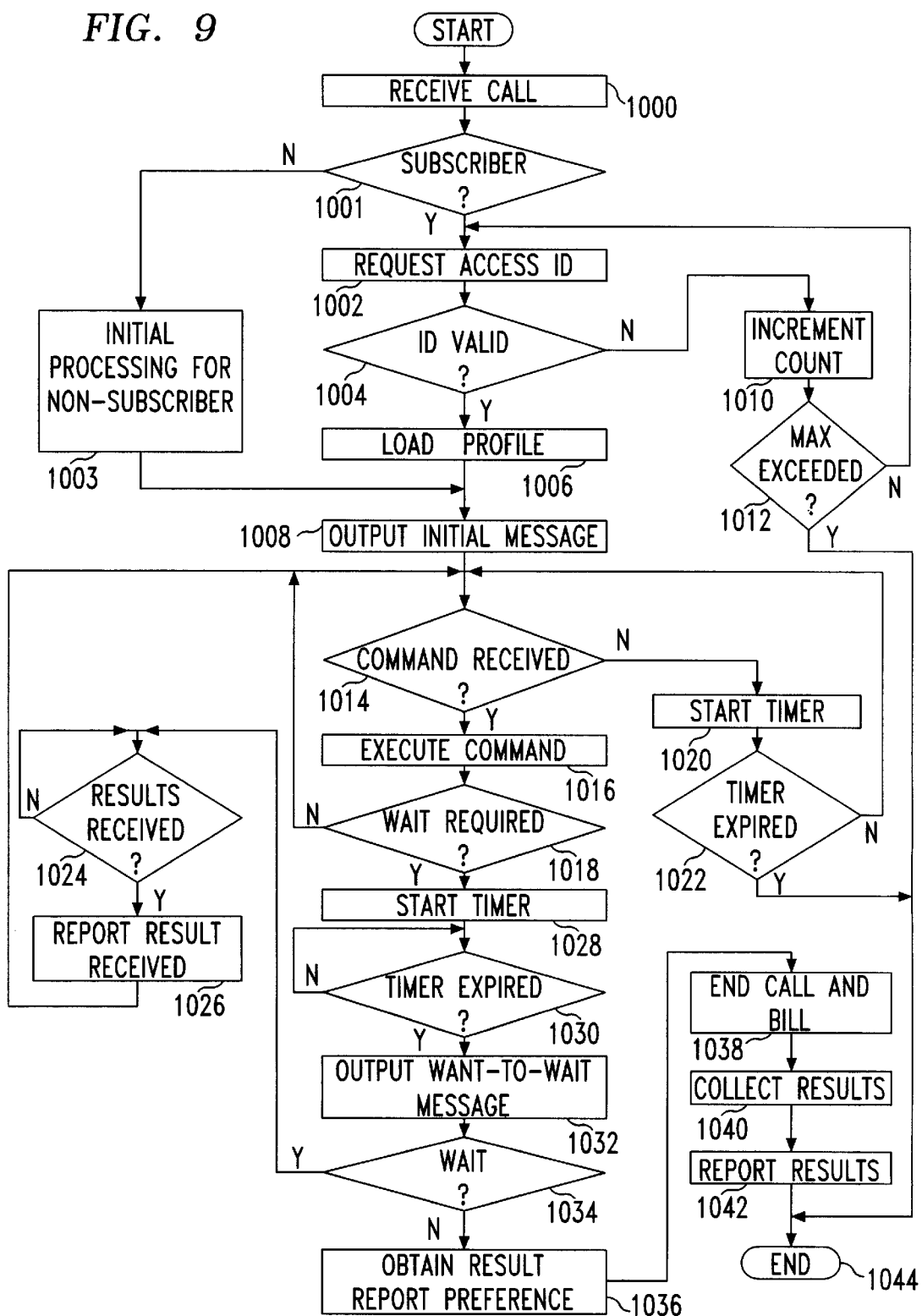
FIG. 9 shows a flowchart of a process of the telephone-data network access device.

FIG. 9 shows a flowchart of a process of the controller 202. In step 1000, the controller 202 receives the call from the caller and goes to step 1001. In step 1001, the controller 202 determines whether the caller is a subscriber. If the caller is a subscriber, the controller 202 goes to step 1002; otherwise, the controller goes to step 1003. In step 1003, the controller performs initial processing for non-subscribers and then goes to step 1008.

In step 1002, the controller 202 requests from the caller the caller access identification and goes to step 1004. The caller access identification may be a password, a voice print of the caller and/or the MIN/ESN of a cellphone, for example. In step 1004, the controller 202 determines whether the access identification is valid. If valid, the controller 202 goes to step 1006; otherwise the controller 202 goes to step 1010. In step 1010, the controller 202 increments a count and goes to step 1012. In step 1012, the controller 202 determines whether a maximum count has been exceeded. If exceeded, the controller 202 goes to step 1044 and ends the call; otherwise, the controller 202 returns to step 1002. In step 1006, the controller 202 loads the subscriber profile and goes to step 1008.

In step 1008, the controller 202 outputs an initial message to invite the caller to issue a command and goes to step 1014. In step 1014, the controller 202 determines whether the command has been received. If received, the controller 202 goes to step 1016; otherwise, the controller 202 goes to step 1020. In step 1020, the controller 202 starts a timer and goes to step 1022. In step 1022, the controller 202 determines whether the timer has expired. If expired, the controller 202 goes to step 1044; otherwise, the controller 202 returns to step 1014.

In step 1016, the controller 202 executes the received command and goes to step 1018. In step 1018, the controller 202 determines whether wait time is required before receiving the results of the command. If wait time is required, the controller 202 goes to step 1028; otherwise, the controller 202 returns to step 1014. In step 1028, the controller 202 starts a timer and goes to step 1030. In step 1030, the controller 202 determines whether the timer has expired. If expired, the controller 202 goes to step 1032; otherwise, the controller 202 returns to step 1030.

In step 1032, the controller 202 outputs a message to the caller to query whether the caller desires to wait for the results of the command and goes to step 1034. In step 1034, the controller 202 determines whether the caller desires to wait. If the caller desires to wait, the controller 202 goes to step 1024; otherwise, the controller 202 goes to step 1036. In step 1024, the controller 202 determines whether the results have been received. If received, the controller 202 goes to step 1026; otherwise, the controller 202 returns to step 1024. In step 1026, the controller 202 reports the results of the command to the caller. If the results are in text, the controller 202 sends the results to the converter 210 to convert the text into voice and sends the voice to the caller. If the results include audio signals, the audio signals may be sent directly to the caller. Then the controller 202 returns to step 1014.

In step 1036, the controller 202 obtains the data return parameters 214 from the profile and goes to step 1038. In step 1038, the controller 202 ends the call and bills the caller's account and goes to step 1040. The billing process may be performed later as details of specific circumstances may require. In step 1040, the controller 202 collects the results in a database, for example, and goes to step 1042. In step 1042, the controller 202 either informs the caller that the results are available or reports the results to the caller based on the instructions contained in the profile and goes to step 1044 and ends the process.

Figure 10:
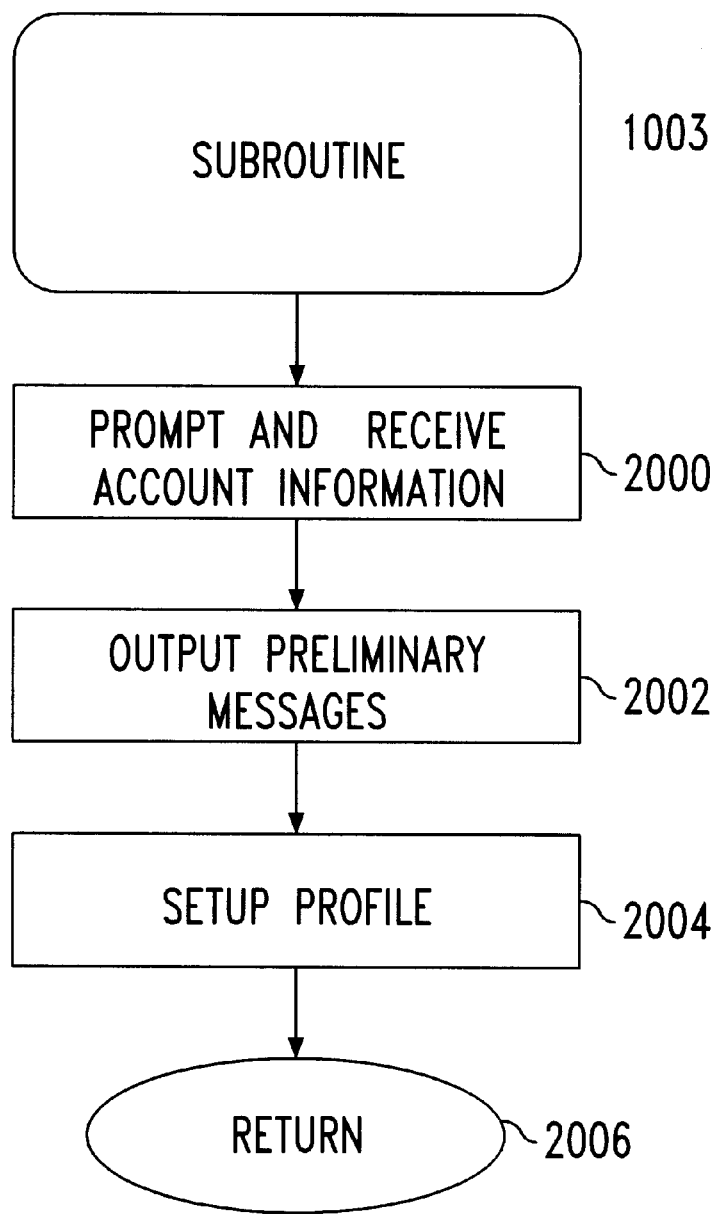
FIG. 10 shows a flowchart of a process for non-subscribers.

FIG. 10 shows a flowchart for a process of step 1003 as shown in FIG. 9. In step 2000, the controller 202 prompts and receives account information from the caller and goes to step 2002. In step 2002, the controller 202 outputs preliminary messages to introduce the caller to the telephone-data network access system 100 and provides a summary of the various features and ground rules for operation so that the caller may be familiarized with the service being offered. Such messages may be bypassed by the caller if the caller is a familiar user, for example. Then the controller 202 goes to step 2004 and sets up a profile for the caller. This profile may be determined by interacting with the caller or a default profile may be used. After the profile is determined, the controller 202 goes to step 2006 and returns control to step 1008 as shown in FIG. 9.

Figure 11:
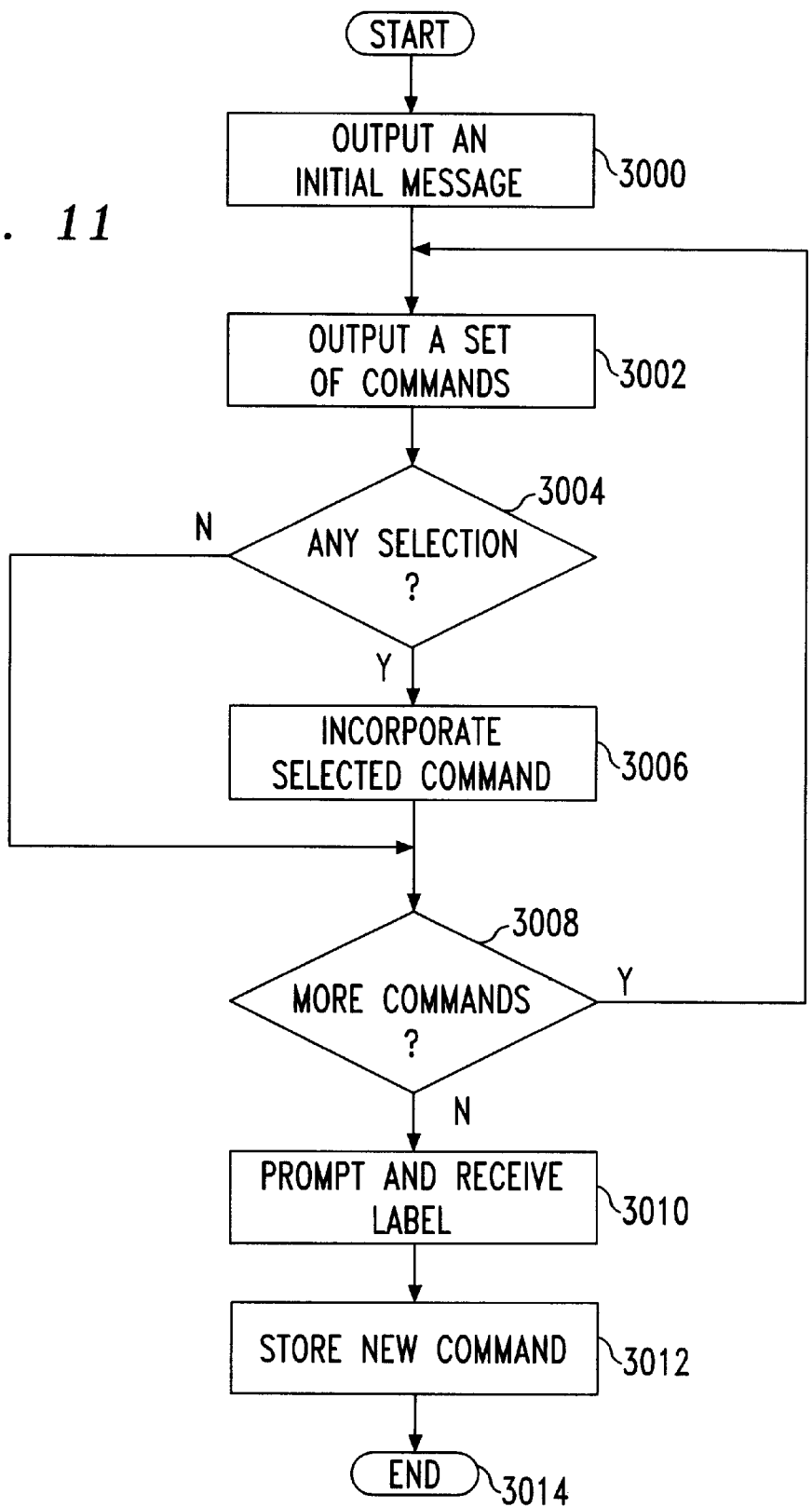
FIG. 11 shows a flowchart of a process to generate command macros.

FIG. 11 shows an exemplary flowchart of a process of the telephone-data network device 102 to permit a caller to generate new commands. In step 3000, the controller 202 outputs an initial message to the caller and goes to step 3002. This message may include instructions on the new command generation procedure and how to select primitive commands and assign it to a label (i.e., either a voice label or a text label such as "*3", for example). In step 3002, the controller 202 outputs primitive commands to the caller. The primitive commands may be output to the caller either individually or as sets of commands at one time with each of the primitive commands identified by a number, for example. Thus, the caller may select any one of the primitive commands by merely identifying the number either by saying the number corresponding to the primitive command or pressing one of the numbered keys of a keypad of a telephone station, for example. After outputting the primitive commands, the controller 202 goes to step 3004. In step 3004, the controller 202 determines whether the caller has selected any of the primitive commands output to the caller. If the caller has selected a primitive command, the controller 202 goes to step 3006; otherwise, the controller 202 goes to step 3008. In step 3006, the controller 202 incorporates the selected command into the definition of a new command and goes to step 3008.

In step 3008, the controller 202 determines whether more primitive commands may be output to the caller. If more primitive commands are to be output to the caller, the controller 202 returns to step 3002, otherwise, the controller goes to step 3010. In step 3010, the controller 202 receives the label from the caller and goes to step 3102. In step 3012, the controller 202 associates the label provided by the caller with the new command generated by the above process and stores the new command in the command database and goes to step 3014 and ends the process.

Figure 12:
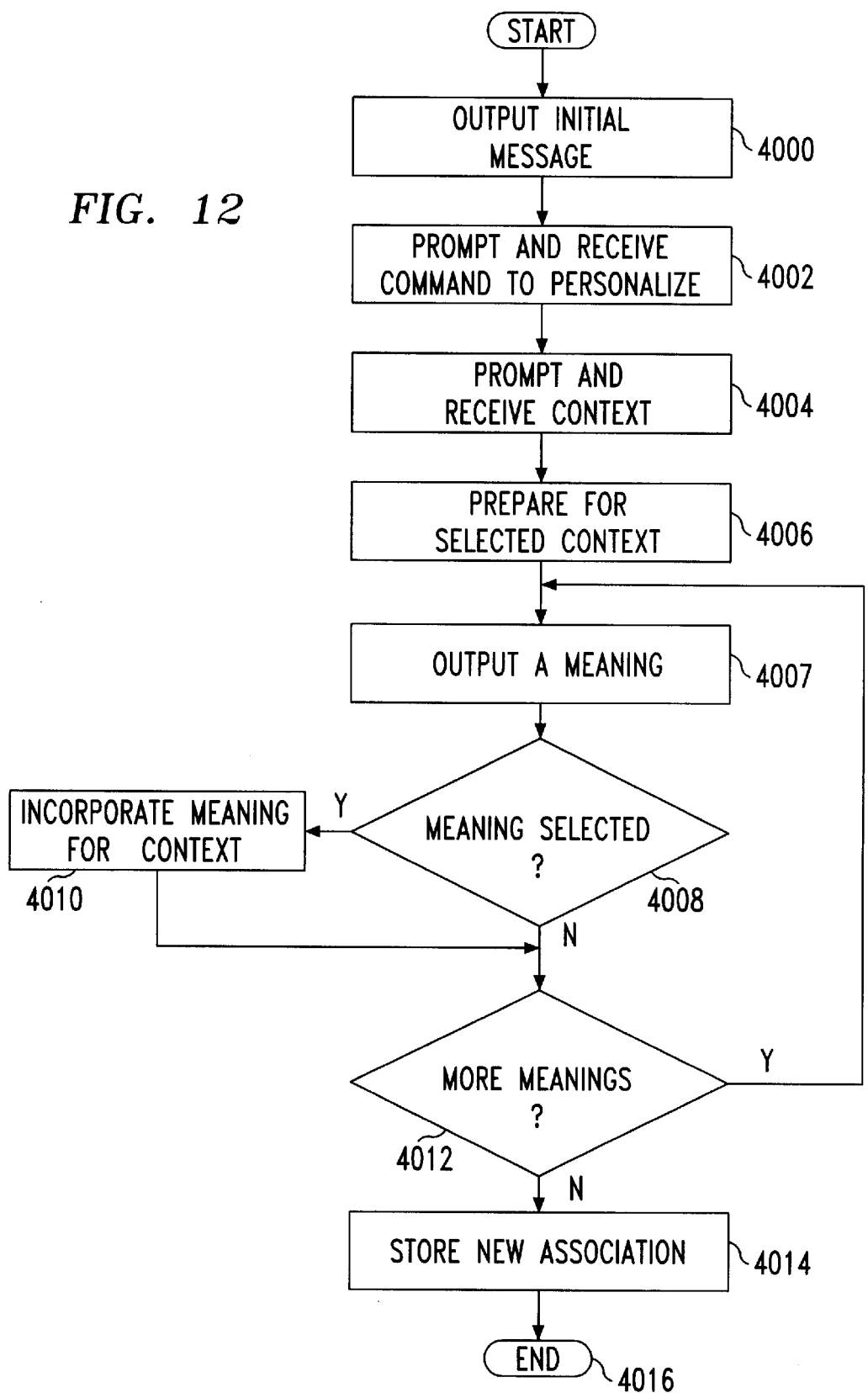
FIG. 12 shows a flowchart of a process to personalize a command for a selected context with selected meanings.

FIG. 12 shows an exemplary flowchart showing the process of the telephone-data network device 102 for the user to personalize existing commands to tailor a command to a particular context having a particular meaning. In step 4000, the controller 202 outputs an initial message and goes to step 4002. Again, the initial message explains the personalization process and the type of information that may be required from the caller, for example. In step 4002, the controller 202 prompts and receives from the caller a request to personalize a selected command and goes to step 4004. In step 4004, the controller 202 outputs to the caller a list of contexts that may be selected by the caller for the selected command, and goes to step 4006. The controller 202 may output the contexts by speaking an identification for each of the contexts associated with a number and the caller may select one of the contexts by simply saying the number or pressing one of the numbered keys of the keypad of a telephone station, for example. In step 4006, the controller 202 prepares for the selected context and goes to step 4007. For example, the controller 202 may retrieve from a database all the possible meanings that may be associated with the selected command in the selected context.

In step 4007, the controller 202 outputs one meaning of a set of meanings associated with the selected command for the selected context and goes to step 4008. In step 4008, the controller 202 determines whether the caller selected the meaning that was output to the caller. If the meaning was selected, the controller 202 goes to step 4010; otherwise, the controller goes to step 4012. In step 4010, the controller 202 incorporates the selected meaning into the selected command for the selected context and goes to step 4012. In step 4012, the controller 202 determines whether more meanings may be output to the caller. If more meanings remain, the controller 202 returns to step 4007, otherwise, the controller 202 goes to step 4014. In step 4014, the controller 202 stores the new association of the selected command with the newly incorporated meaning for the selected context and goes to step 4016 and ends the process.

While this invention has been described in conjunction with specific embodiments thereof, it is evident that many alternatives, modifications and variations will be apparent to those skilled in the art. Accordingly, preferred embodiments of the invention as set forth herein are intended to be illustrative and not limiting. Various changes may be made without departing from the spirit and scope of the invention.

What is claimed is:

1. A method for accessing a data network through a voice communication device coupled to a telephone network, comprising:

receiving a telephone call of a caller from the voice communication device through the telephone network;

accessing the data network based on commands received from the call;

determining, based on a data return parameter in a user profile, the data return parameter including at least a parameter that indicates whether to deliver the results immediately or at a later time when the results become available;

collecting portions of the results in a memory if results are to be delivered at a later time; and delivering the results to the caller.

2. The method of claim 1, further comprising:

receiving the commands from the voice communication device;

translating the commands into a function that is to be performed; and performing the function.

3. The method of claim 2, wherein the commands include at least one of voice commands or keypad commands entered via a keypad of the voice communication terminal.

4. The method of claim 3, wherein if a command is a voice command, the translating step includes converting the voice command into a text command and performing a function of the text command.

5. The method of claim 2, wherein the function comprises at least one of:

setting up a log-on ID on the data network;

logging on to the data network;

accessing pages reachable through the data network;

sending e-mail through the data network;

retrieving e-mail received through the data network;

searching the data network;

chatting on the data network; and sending messages to a forum on the data network.

6. The method of claim 1, further comprising:

providing primitive commands to a caller through the voice communication device;

receiving from the caller a label for a new command;

receiving from the caller at least one selection from ones of the primitive commands;

generating the new command based on the caller selection; and identifying the new command with the label.

7. The method of claim 6, wherein the primitive commands include at least one of skip, repeat, faster, slower, search, find, sort, send, receive, print, save, go to, bookmark, go mark, fax, and dictate.

8. The method of claim 7, further comprising:

providing a set of contexts to the caller through the voice communication device;

receiving from the caller a command and a selected context from the set of contexts;

providing a set of meanings to be associated with the command;

receiving from the caller a selected meaning from the set of meanings; and associating the selected meaning with the command for the selected context.

9. The method of claim 1, further comprising alerting the caller when all portions of the results are collected, the caller being alerted by at least one of initiating a telephone call, sending a message to a pager, sending a facsimile to a designated facsimile number, and leaving a voice mail in a voice mailbox.

10. The method of claim 1, wherein the delivering step comprises at least one of outputting the results to the caller through the voice communication device, sending a facsimile containing the results to a designated facsimile number, and mailing a copy of the results.

11. A telephone-data network access device, comprising:

a data network interface;

a memory; and a controller coupled to the data network and the memory, the controller receiving a telephone call of a caller from a voice communication device through the telephone network, accessing the data network based on commands received from the call, wherein the controller determines, based on a data return parameter in a user profile, the data return parameter including at least a parameter that indicates whether to deliver the results immediately or at a later time, collects portions of the results in a memory if the results are to be delivered at a later time, and delivers the results to the caller.

12. The device of claim 11, wherein the controller receives the commands from the voice communication device, translates the commands into a function that is to be performed, and performs the function.

13. The device of claim 12, wherein the commands include at least one of voice commands or keypad commands entered via a keypad of the voice communication terminal.

14. The device of claim 13, wherein if a command is a voice command, the controller converts the voice command into a text command and performing a function of the text command.

15. The device of claim 12, wherein the function comprises at least one of:

setting up a log-on ID on the data network;

logging on to the data network;

accessing pages reachable through the data network;

sending e-mail through the data network;

retrieving e-mail received through the data network;

searching the data network;

chatting on the data network; and sending messages to a forum on the data network.

16. The device of claim 11, wherein the controller provides primitive commands to a caller through the voice communication device, receives from the caller a label for a new command, receives from the caller at least one selection from ones of the primitive commands, and generates the new command based on the caller selection, the label identifying the new command.

17. The device of claim 16, wherein the primitive commands include at least one of skip, repeat, faster, slower, search, find, sort, send, receive, print, save, go to, bookmark, go mark, fax, and dictate.

18. The device of claim 17, wherein the controller provides a set of contexts to the caller through the voice communication device, receives from the caller a command and a selected context from the set of contexts, provides a set of meanings to be associated with the command, receives from the caller a selected meaning from the set of meanings, and associates the selected meaning with the command for the selected context.

19. The device of claim 11, wherein the controller alerts the caller when all portions of the results are collected, the caller being alerted by at least one of initiating a telephone call, sending a message to a pager, sending a facsimile to a designated facsimile number, and leaving a voice mail in a voice mailbox.

20. The device of claim 11, wherein the controller at least one of outputs the results to the caller through the voice communication device, sends a facsimile containing the results to a designated facsimile number, and mails a copy of the results.

* * * * *